United States Patent
Wang et al.

(10) Patent No.: US 9,838,937 B2
(45) Date of Patent: *Dec. 5, 2017

(54) METHOD AND APPARATUS FOR ASSIGNING DATA TO SPLIT BEARERS IN DUAL CONNECTIVITY

(71) Applicant: Samsung Electronics Co., Ltd., Suwon-si, Gyeonggi-do (KR)

(72) Inventors: Hong Wang, Beijing (CN); Lixiang Xu, Beijing (CN); Xiaowan Ke, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/878,723

(22) Filed: Oct. 8, 2015

(65) Prior Publication Data

US 2016/0029283 A1 Jan. 28, 2016

Related U.S. Application Data

(63) Continuation of application No. 14/747,409, filed on Jun. 23, 2015.

(30) Foreign Application Priority Data

Jun. 23, 2014 (CN) .......................... 2014 1 0283197
Sep. 25, 2014 (CN) .......................... 2014 1 0497636

(51) Int. Cl.
*H04W 4/00* (2009.01)
*H04W 36/28* (2009.01)
(Continued)

(52) U.S. Cl.
CPC ............ *H04W 36/28* (2013.01); *H04B 7/155* (2013.01); *H04L 49/3072* (2013.01);
(Continued)

(58) Field of Classification Search
CPC . H04W 36/28; H04W 36/023; H04W 76/021; H04W 76/022; H04W 72/0413;
(Continued)

(56) References Cited

U.S. PATENT DOCUMENTS

| 2009/0141684 A1* | 6/2009 | Hashimoto ........... H04W 36/02 370/331 |
| 2012/0039182 A1* | 2/2012 | Zhou ..................... H04L 1/1893 370/241 |

(Continued)

OTHER PUBLICATIONS

Blackberry, UK Ltd., "Necessity of Flow Control for Various U-Plane Alternatives," R2-132443, 3GPP TSG RAN WG2 Meeting #83, Barcelona, Spain, Aug. 9, 2013.
(Continued)

*Primary Examiner* — Kevin Mew
(74) *Attorney, Agent, or Firm* — Jefferson IP Law, LLP

(57) ABSTRACT

A method and an apparatus for assigning data to split bearers in dual connectivity is provided. The apparatus includes a master evolved Node B (MeNB) of a user equipment (UE) configured to receive information of available buffer decided and transmitted by a secondary eNB (SeNB) through an X2 interface between the MeNB and the SeNB, determine whether the information is about available buffer for a UE or for an evolved radio access bearer (E-RAB) established on the SeNB based on an indicator in the information or a bearer that transported the information, and adjust the amount of data assigned to the SeNB according to the information of the available buffer. The apparatus can accommodate eNBs implemented in various manners, make full use of the bandwidth of data bearers, and reduce delay in data transmission.

8 Claims, 10 Drawing Sheets

(51) Int. Cl.
*H04W 76/02* (2009.01)
*H04W 28/02* (2009.01)
*H04B 7/155* (2006.01)
*H04W 36/02* (2009.01)
*H04L 12/935* (2013.01)
*H04W 72/04* (2009.01)
*H04L 29/06* (2006.01)
*H04W 72/12* (2009.01)
*H04W 28/08* (2009.01)
*H04W 88/08* (2009.01)
*H04W 92/20* (2009.01)

(52) U.S. Cl.
CPC ......... *H04L 69/22* (2013.01); *H04W 28/0278* (2013.01); *H04W 28/08* (2013.01); *H04W 36/023* (2013.01); *H04W 72/044* (2013.01); *H04W 72/0413* (2013.01); *H04W 72/1252* (2013.01); *H04W 76/021* (2013.01); *H04W 76/022* (2013.01); *H04W 72/1278* (2013.01); *H04W 76/025* (2013.01); *H04W 88/08* (2013.01); *H04W 92/20* (2013.01)

(58) Field of Classification Search
CPC ........... H04W 72/044; H04W 72/1252; H04W 72/1278; H04W 28/0278; H04W 28/08; H04W 88/08; H04W 92/20; H04L 49/3072; H04L 69/22; H04B 7/155
See application file for complete search history.

(56) References Cited

U.S. PATENT DOCUMENTS

| | | | | |
|---|---|---|---|---|
| 2012/0244871 A1* | 9/2012 | Zhao | ..................... | H04W 16/10 455/452.1 |
| 2013/0301439 A1* | 11/2013 | Heo | ..................... | H04W 76/048 370/252 |
| 2013/0301570 A1* | 11/2013 | Xu | ..................... | H04L 5/0073 370/329 |
| 2014/0185467 A1* | 7/2014 | Heo | ..................... | H04W 52/54 370/252 |
| 2014/0198767 A1* | 7/2014 | Heo | ..................... | H04W 36/023 370/331 |
| 2014/0235246 A1* | 8/2014 | Lin | ..................... | H04W 36/0016 455/436 |
| 2014/0293896 A1* | 10/2014 | Kuo | ..................... | H04W 72/0413 370/329 |
| 2014/0369242 A1* | 12/2014 | Ng | ..................... | H04W 72/0453 370/280 |
| 2015/0043435 A1* | 2/2015 | Blankenship | ......... | H04L 69/322 370/329 |
| 2015/0043492 A1* | 2/2015 | Baek | ................ | H04W 56/0005 370/329 |
| 2015/0085667 A1* | 3/2015 | Sivanesan | ............ | H04W 24/04 370/237 |
| 2015/0098322 A1* | 4/2015 | Chen | ................ | H04W 72/0413 370/230 |
| 2015/0124748 A1* | 5/2015 | Park | ..................... | H04L 5/0032 370/329 |
| 2015/0201383 A1* | 7/2015 | Papasakellariou | .. | H04W 52/367 370/278 |
| 2015/0215826 A1* | 7/2015 | Yamada | ............ | H04W 36/0072 455/436 |
| 2015/0245349 A1* | 8/2015 | Jha | ..................... | H04W 28/0205 370/329 |
| 2015/0271811 A1* | 9/2015 | Kim | ..................... | H04W 52/146 370/329 |
| 2015/0271836 A1* | 9/2015 | Damnjanovic | ... | H04W 72/0413 370/329 |
| 2015/0282152 A1* | 10/2015 | Wang | ..................... | H04L 5/0092 370/329 |
| 2015/0326456 A1* | 11/2015 | Dudda | .................. | H04L 43/062 370/252 |
| 2016/0050054 A1* | 2/2016 | Wager | ..................... | H04L 5/0035 455/450 |
| 2016/0066284 A1* | 3/2016 | Kwon | ................ | H04W 52/365 370/329 |
| 2016/0150440 A1* | 5/2016 | Lee | ..................... | H04W 24/10 455/422.1 |
| 2016/0205685 A1* | 7/2016 | Wang | ..................... | H04L 5/001 370/229 |
| 2016/0234847 A1* | 8/2016 | Zhang | ............... | H04W 36/0055 |
| 2017/0041940 A1* | 2/2017 | Falconetti | ............... | H04L 5/006 |
| 2017/0170941 A1* | 6/2017 | Yang | ..................... | H04L 5/0098 |

OTHER PUBLICATIONS

LG Electronics Inc., "BSR Impacts by Bearer Split," R2-132583, 3GPP TSG RAN WG2 Meeting #83, Barcelona, Spain, Aug. 9, 2013.

LG Electronics Inc., "LCP Impacts by Bearer Split," R2-132584, 3GPP TSG RAN WG2 Meeting #83, Barcelona, Spain, Aug. 9, 2013.

Ericsson et al., "Comparison of Intra-Bearer UP Architectures," R2-132714, 3GPP TSG RAN WG2 Meeting #83, Barcelona, Spain, Aug. 10, 2013.

Nsn et al., "Comparison of the UP Alternatives," R2-132992, 3GPP TSG RAN WG2 Meeting #83, Barcelona, Spain, Aug. 23, 2013.

* cited by examiner

FIG. 9

| Bit | | | | | | | |
|---|---|---|---|---|---|---|---|
| 7 | 6 | 5 | 4 | 3 | 2 | 1 | 0 |
| PDU Type | | | | Reserved | | | |
| Other information | | | | | | | |
| the largest PDCP serial number of PDCP packets sequentially transmitted | | | | | | | |
| information of packets lost on X2 | | | | | | | |

FIG. 10

| X2 SN | 7 | 8 | 9 | 10 | 11 | 12 |
|---|---|---|---|---|---|---|
| PDCP SN | 1007 | 1008 | 1009 | 1010 | 1011 | 1012 |

METHOD AND APPARATUS FOR ASSIGNING DATA TO SPLIT BEARERS IN DUAL CONNECTIVITY

CROSS-REFERENCE TO RELATED APPLICATION(S)

This application is a continuation application of prior application Ser. No. 14/747,409, filed on Jun. 23, 2015, which claims the benefit under 35 U.S.C. §119(a) of a Chinese patent application filed on Jun. 23, 2014 in the State Intellectual Property Office and assigned Serial number 201410283197.4, and of a Chinese patent application filed on Sep. 25, 2014 in the State Intellectual Property Office and assigned Serial number 201410497636.1, the entire disclosure of each of which is hereby incorporated by reference.

TECHNICAL FIELD

The present disclosure relates to wireless communications. More particularly, the present disclosure relates to a method and an apparatus for assigning data to split bearers in dual connectivity.

BACKGROUND

Modern mobile communications are tending to provide high speed transmission of multimedia services for users.

FIG. 1 is a schematic diagram illustrating a structure of a system architecture evolution (SAE) system according to the related art.

Referring to FIG. 1, in the system, a user equipment (UE) 101 is a terminal device which receives data. An evolved universal terrestrial radio access network (E-UTRAN) 102 is a wireless access network which includes evolved Node Bs (eNBs)/NBs which provide UEs with interfaces for accessing the wireless network. A mobility management entity (MME) 103 manages mobility context, session context and security information of UEs. A service gateway (SGW) 104 provides user plane functions. The MME 103 and SGW 104 may reside in the same physical entity. A packet data network (PDN) gateway (PGW) 105 implements functions including accounting, lawful interception and so on, and may reside in the same physical entity with SGW 104. A policy and charging rule functions (PCRF) 106 provides quality of service (QoS) policies and charging rules. A serving general packet radio service (GPRS) support node (SGSN) 108 is a network node device providing routing for data transmission in the universal mobile telecommunications system (UMTS). A home subscriber server (HSS) 109 is a home sub system of the UE, and maintains user information including a current location of the UE, the address of the serving node, user security information, packet data context of the UE, and so on.

In long term evolution (LTE) systems of the related art, each cell supports a maximum bandwidth of 20 MHz. LTE-advanced systems adopt carrier convergence to increase peak data rate of UEs. With the carrier convergence technique, a UE may at the same time communicate with multiple cells that are working at different carrier frequencies under the control of one eNB, which provides a maximum transmission bandwidth of 100 MHz, therefore uplink/downlink peak data rate can be increased by several times.

In order to increase the transmission bandwidth, multiple cells may provide service for the same UE. The multiple cells may from the same eNB or from different eNBs. The technique is referred to as carrier aggregation, or dual connectivity.

FIG. 2 is a schematic diagram illustrating a cross-eNB carrier convergence mechanism according to the related art.

Referring to FIG. 2, for a UE working under carrier aggregation, aggregated cells includes a primary cell (PCell) and at least one secondary cell (SCell). There is only one PCell, and the PCell is always activated. The PCell can only be changed through a handover process, and NAS information is only transmitted and received by the UE through the PCell. Physical uplink control channel (PUCCH) can only be transmitted by the PCell. The PCell and the SCell may from different eNBs. The eNB to which the PCell belongs is referred to as a master eNB (MeNB), and the eNB to which the SCell belongs is referred to as a Secondary eNB (SeNB). The MeNB and the SeNB are connected with each other through an X2 interface.

The dual connectivity mechanism provides two manners of establishing bearers. One manner is referred to as split bearer, i.e., a data bearer from the core network to an MeNB is split into two radio bearers which are respectively established on the MeNB and an SeNB. The MeNB performs data splitting, and transmits data packets assigned to the SeNB via the X2 interface to the SeNB. The UE receives downlink data simultaneously from the radio bearers on the MeNB and the SeNB. Regarding downlink data, when an MeNB receives data from the core network, the MeNB performs data encryption, and splits the data packets of packet data convergence protocol (PDCP) so that one part of the data packets are transmitted to the UE via the radio bearer on the MeNB while the other part of the data packets are transmitted to the UE via the radio bearer on the SeNB. The MeNB decides the amount of data packets transmitted respectively by the MeNB and the SeNB, i.e., deciding data packets that are to be transmitted by the MeNB and data packets that are to be transmitted by the SeNB. A properly decided proportion can effectively increase data throughput of the UE. An improper proportion may cause delay in sequencing received data, which reduces data throughput. Therefore, the SeNB is required to report information to the MeNB for the MeNB to decide a proper data split ratio, i.e., deciding the amount of data packets to be transmitted via the SeNB. The information may include the quality of the radio channel between the SeNB and the UE, information about the capacity of available buffer in the SeNB, and the like.

Currently, there is no specification as to whether the capacity of data buffer refers to the capacity allocated for a UE or for a bearer. Buffer of different eNBs may be implemented differently. Some manufacturers produce eNBs that allocate buffer according to UEs, while other manufacturers produce eNBs that allocate buffer according to bearers. Therefore, there is no mechanism that can accommodate the differences of eNBs and provide a flexible manner for reporting the information. The present disclosure provide a method which can better adapt to different implementation manners of eNBs produced by different device providers, effectively use data bearer bandwidth, and reduce data transmission delay.

Therefore, a need exists for a method and an apparatus for assigning data to split bearers in dual connectivity which can better adapt to different implementation manners of eNBs, effectively use data bearer bandwidth, and reduce data transmission delay.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for assigning data to split bearers in dual connectivity which can better adapt to different implementation manners of eNBs, effectively use data bearer bandwidth, and reduce data transmission delay.

In accordance with an aspect of the present disclosure, a method of assigning data to split bearers in dual connectivity is provided. The method includes receiving, by a master evolved Node B (MeNB) of a user equipment (UE) via an X2 interface between the MeNB and a secondary eNB (SeNB), information of available buffer decided by the SeNB, deciding the available buffer is available buffer for the UE or available buffer for an enhanced radio access bearer (E-RAB) on the SeNB according to an indicator in the information of the available buffer or according to a bearer that transported the information of the available buffer, and adjusting, by the MeNB, the amount of data assigned to the SeNB according to the received information of the available buffer.

In accordance with another aspect of the present disclosure, a method of an MeNB receiving information of an available buffer is provided. The method includes receiving, by the MeNB via a user data bearer on the X2 interface, the information of the available buffer transmitted by the SeNB which includes the indicator specifying whether the information is about available buffer for a UE or about available buffer for an enhanced radio access bearer (E-RAB) on the SeNB.

In accordance with another aspect of the present disclosure, a method of an MeNB receiving information of an available buffer is provided. The method includes receiving, by the MeNB, the information of the available buffer via a UE uplink tunnel established on the X2 interface or via a user data bearer corresponding to the E-RAB established on the X2 interface.

In accordance with another aspect of the present disclosure, a method of deciding the available buffer is available buffer for the UE or available buffer for an E-RAB on the SeNB according to a bearer that transported the information of the available buffer is provided. The method includes deciding the available buffer is available buffer for a UE if the information of the available buffer is received from the UE uplink tunnel and deciding the available buffer is available buffer for the E-RAB if the information of the available buffer is received from a user data bearer corresponding to the E-RAB.

According to an embodiment of the present disclosure, the UE uplink tunnel is established during establishment of the SeNB.

According to an embodiment of the present disclosure, the MeNB informs the SeNB of a tunnel identifier (ID) of the UE uplink tunnel by transmitting an add SeNB request including information of the UE uplink tunnel to the SeNB.

According to an embodiment of the present disclosure, the method of the MeNB receiving the information of the available buffer may include receiving, by the MeNB, the information of the available buffer from a user data bearer on the X2 interface.

In accordance with another aspect of the present disclosure, an indicator in the information of the available buffer is provided. The indicator includes capabilities information of the SeNB transmitted to the MeNB in advance by the SeNB or configured in the MeNB in advance for specifying whether the information of the available buffer transmitted by the SeNB is for the UE or for the E-RAB.

According to an embodiment of the present disclosure, the SeNB transmitted the capabilities information of the SeNB during the SeNB or the X2 interface was established.

According to an embodiment of the present disclosure, the information of the available buffer is transmitted in a general packet radio service tunneling protocol user (GTP-U) packet header or in a data packet transmitted in an uplink data tunnel of the user data bearer or in the UE uplink tunnel.

According to an embodiment of the present disclosure, when the SeNB determining the information of currently available buffer, the available buffer for the UE is determined according to the amount of data packets currently in the buffer reserved for the UE and/or the quality of the radio interface between the UE and the SeNB; and/or the available buffer for the E-RAB is determined according to the amount of data packets currently in the buffer reserved for the E-RAB and/or the quality of the radio interface between the UE and the SeNB.

According to an embodiment of the present disclosure, the MeNB may adjust the amount of data assigned to the SeNB according to the size of the available buffer if the information of the available buffer is the available buffer for the E-RAB; and/or the MeNB may adjust the amount of data assigned to each E-RAB on the SeNB according to quality of service (QoS) and/or priority level of each E-RAB when at least two E-RABs have been established on the SeNB if the information of the available buffer is for the UE.

In accordance with another aspect of the present disclosure, an apparatus for assigning data to split bearers in dual connectivity is provided. The apparatus includes an available buffer deciding module and a data assigning module, the available buffer deciding module is configured for receiving information of available buffer decided and transmitted by an SeNB via an X2 interface to the SeNB, and deciding whether the information is about available buffer for a UE or about an E-RAB on the SeNB according to an indicator in the information of the available buffer or according to a bearer that transported the information of the available buffer, and the data assigning module is configured for adjusting the amount of data assigned to the SeNB according to the received information of the available buffer.

The above technical mechanism provide multiple possible report manners for operators, support eNBs provided by different device producers, is adaptable to eNBs implemented in different manners, can effectively use bandwidth of data bearers, and reduce delay in data transmission.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 is a schematic diagram illustrating a report of data transmission status according to an embodiment of the present disclosure; and FIG. 10 is a schematic diagram illustrating serial numbers of X2 transmissions and packet data convergence protocol (PDCP) packets according to an embodiment of the present disclosure.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The method of reporting secondary evolved Node B (SeNB) buffer of various examples of the present disclosure provides multiple possible report manners for operators, supports eNBs produced by different device producers, is adaptable to different implementations of eNBs, can effectively use bandwidth of data bearers, and reduce delay in data transmission. A detailed description of the present disclosure is provided hereinafter with reference to the some embodiments of the present disclosure.

Figure 1:
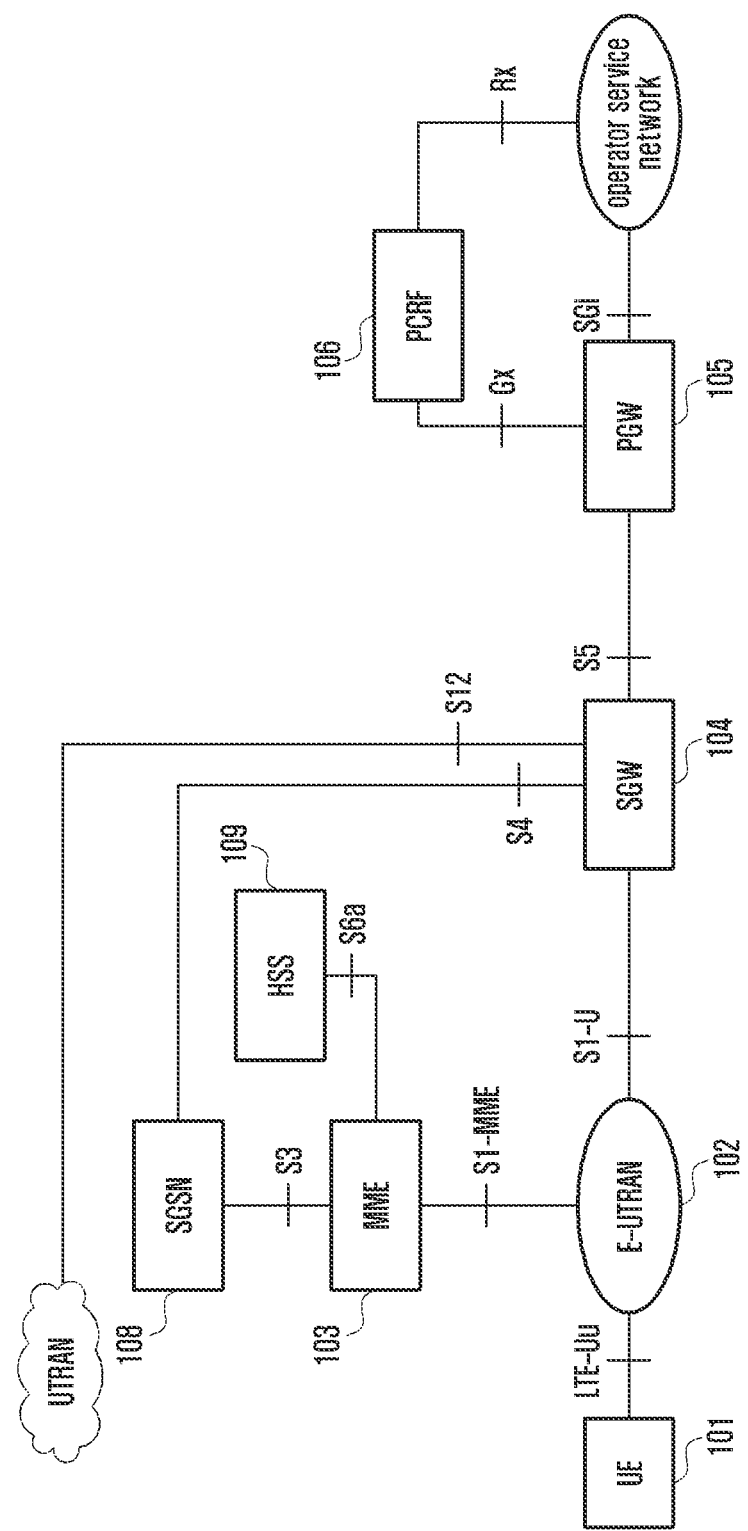
FIG. 1 is a schematic diagram illustrating a structure of a system architecture evolution (SAE) system according to the related art.
Figure 2:
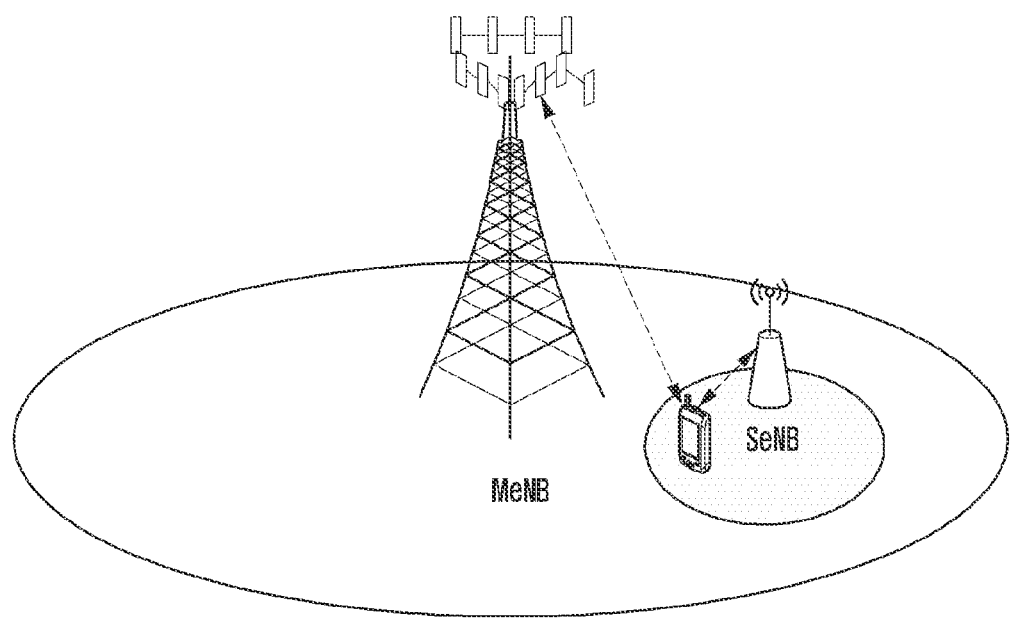
FIG. 2 is a schematic diagram illustrating a cross-evolved node B (eNB) carrier convergence mechanism according to the related art.
Figure 3:
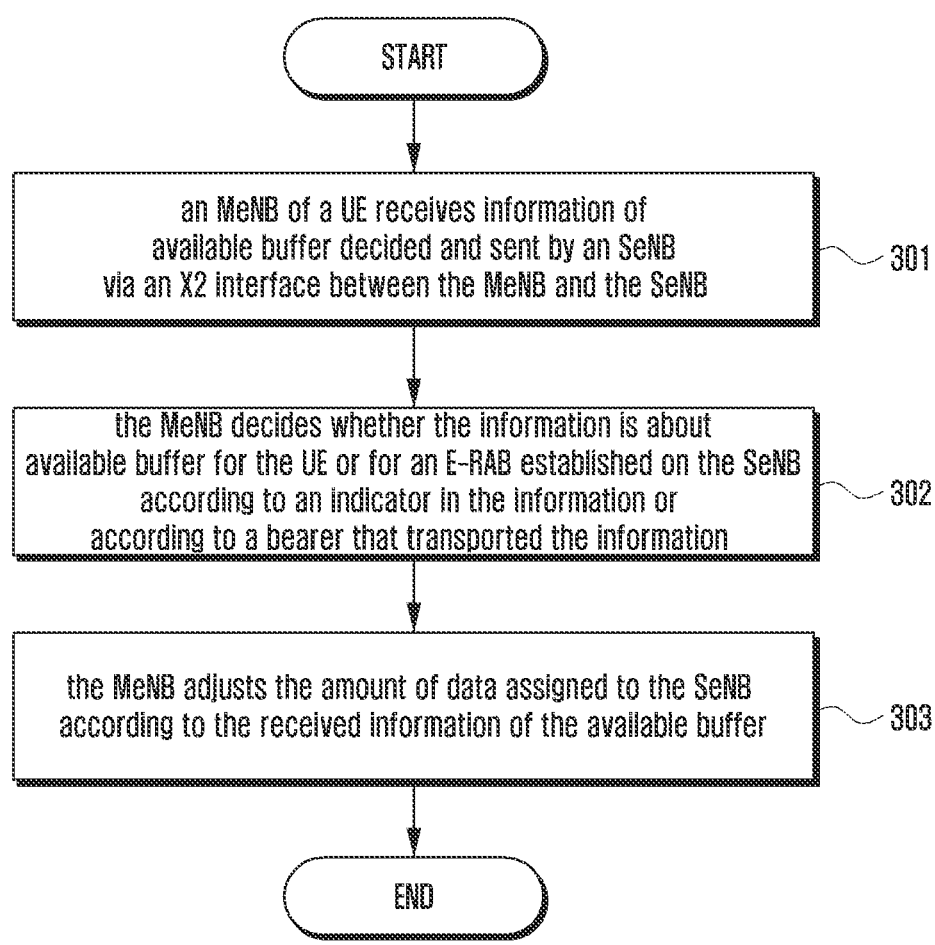
FIG. 3 is a flowchart illustrating a method of assigning data according to an embodiment of the present disclosure.

FIG. 3 is a flowchart illustrating a method of assigning data according to an embodiment of the present disclosure.

Referring to FIG. 3, the method may include the following operations.

At operation 301, a master eNB (MeNB) of a user equipment (UE) receives information of available buffer decided and transmitted by an SeNB via an X2 interface between the MeNB and the SeNB.

At operation 302, the MeNB may determine whether the information of the available buffer is about available buffer for a UE or about available buffer for an evolved radio access bearer (E-RAB) established on the SeNB according to an indicator in the information of the available buffer or according to a bearer that transported the information.

As mentioned above, since eNBs may be implemented in different manners, some eNBs allocate buffer for UEs while other eNBs allocate buffer for bearers. Therefore, the MeNB needs to determine whether the information of the available buffer received is for a UE or for an E-RAB. Various examples provide two manners of making the determination. According to one manner, an indicator is used for specifying the type of the available buffer. The indicator may be transmitted by the SeNB to the MeNB, or may be configured in the MeNB. According to the other manner, the type of the available buffer is decided based on the position of the bearer that transported the information of the available buffer.

At operation 303, the MeNB adjusts the amount of data assigned to the SeNB according to the received information of the available buffer.

After making a determination as to whether the information of the available buffer is about available buffer for a UE or for an E-RAB in operation 302, the MeNB may decide the amount of data assigned to the SeNB when splitting bearers according to the available buffer.

Then the above process is terminated. According to the mechanism, the MeNB can accommodate SeNBs implemented in different manners, determine whether the available buffer is for a UE or for an E-RAB, and adjust the amount of data assigned to the SeNB. Therefore, bandwidth of data bearers can be used effectively, and delay in data transmission is also reduced.

The method is described further in the following with reference to three examples. To simplify description, only interactions between an MeNB and an SeNB are described.

Example 1

In this example, an MeNB established a long term evolution (LTE) RAB of a service on the MeNB and an SeNB, i.e., using the split bearer manner. A user data bearer corresponding to the E-RAB needs to be established on an X2 interface. The user data bearer includes an uplink/downlink data tunnel. The MeNB splits downlink packet data convergence protocol (PDCP) data packets to have some data packets transmitted to the UE by the MeNB and other data packets transmitted via the X2 interface to the SeNB which then transmits the data packets to the UE. The user data bearer on the X2 interface is used for transmitting both user plane PDCP data packets and information for user traffic flow control which includes information of available buffer decided by the SeNB. This example describes a method of the SeNB reporting information of the buffer to the MeNB via an uplink data tunnel.

Figure 4:
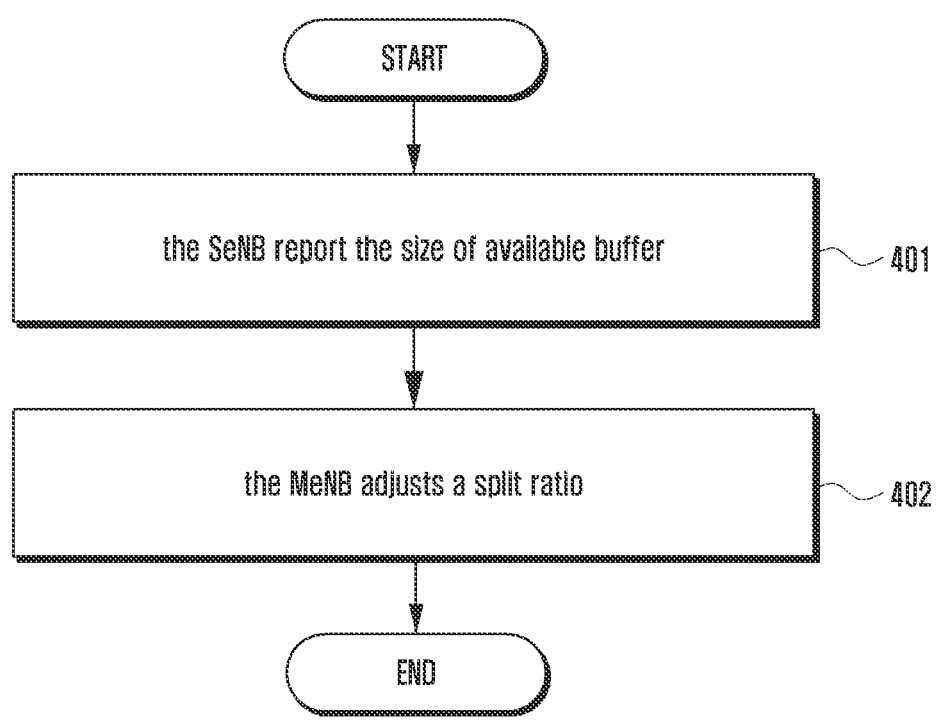
FIG. 4 is a flowchart illustrating a method of adjusting assigned data according to an embodiment of the present disclosure.

FIG. 4 is a flowchart illustrating a method of adjusting assigned data according to an embodiment of the present disclosure.

Referring to FIG. 4, the process may include the following operations.

At operation 401, an SeNB transmits information of decided available buffer to an MeNB.

The information of the available buffer is transmitted in an uplink data tunnel in a user data bearer corresponding to an E-RAB. The information may be transmitted alone or together with a data packet. The uplink data tunnel is established during a process of adding or modifying the SeNB. The process may include the MeNB transmitting an add/modify SeNB request which includes information of the quality of a radio data bearer, an Internet protocol (IP) address and a tunnel identifier (ID) for uplink data reception, information of capabilities of a UE, configuration information of resources on the MeNB, and the like. The SeNB may transmit to the MeNB a response which includes configuration information of the radio data bearer, an IP address and a tunnel ID for downlink data reception, and the like. The information of the available buffer of the SeNB is transmitted to the MeNB via the established uplink data tunnel.

The information of the available buffer may be transmitted in the header or the data packet field of a general packet radio service tunneling protocol user (GTP-U) packet through the uplink data tunnel. The information of the available buffer specifies buffer available in the SeNB in units of bit or Byte. The bigger the available buffer, the more data the SeNB can receive, i.e., the MeNB can assign more data to the SeNB. The available buffer may refer to available buffer for an E-RAB, i.e., available buffer allocated to the E-RAB, and information of the available buffer is transmitted to the MeNB via an uplink data tunnel of the E-RAB. Alternatively, the available buffer may refer to available buffer for a UE, i.e., available buffer allocated to all of bearers established on the SeNB for a UE, and information of the available buffer is transmitted to the MeNB via an uplink data tunnel of one of the bearers, or the same information may be transmitted in uplink data tunnels of all the bearers to the MeNB. The information may be as shown in FIG. 5.

Figure 5:
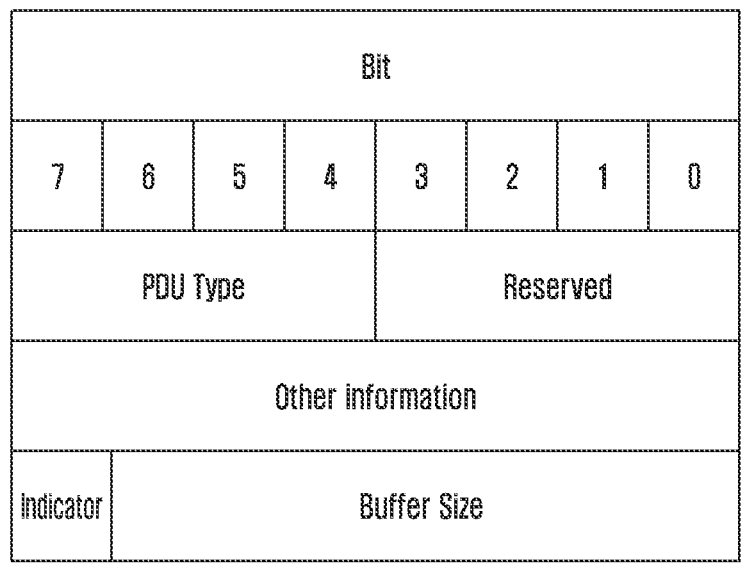
FIG. 5 is a schematic diagram illustrating a data format according to an embodiment of the present disclosure.

FIG. 5 is a schematic diagram illustrating a data format according to an embodiment of the present disclosure.

Referring to FIG. 5, information of available buffer of an SeNB may be specified using 8 bits or data of another length. The most significant bit specifies whether the buffer is for a UE or for an E-RAB. For example, a value of "1" indicates the information is about available buffer for a UE, and a value of "0" indicates the information is about available buffer for an E-RAB. Subsequent 7 bits shown in FIG. 5 indicate the number of bits of the available buffer. Alternatively, the indicator may be placed in the reserved bit next to the packet data unit (PDU) type. The one bit indicates whether the available buffer is for an E-RAB or for all of E-RABs, i.e., for the UE. For example, a reserved bit is used for indicating whether there is the buffer for the UE. The bit set to 1 indicates the format as shown in FIG. 5 includes information of buffer for the UE, and the bit set to 0 indicates the format as shown in FIG. 5 does not include information of the buffer for the UE. Another reserved bit is used for indicating whether there is the buffer for the E-RAB. The bit set to 1 indicates the format as shown in FIG. 5 includes information of buffer for the E-RAB, and the bit set to 0 indicates the format as shown in FIG. 5 does not include information of the buffer for the E-RAB. If both types of buffers are configured in the format, the order of the indicators and the order of the two buffer formats needs to be specified. For example, buffer information of the E-RAB may precede buffer information of the UE, and the indicators arranged in the same order.

The size of the available buffer for a UE may be determined based on the number of packets buffered in the buffer reserved for the UE (i.e., the number of packets currently in the buffer reserved for the UE). The more the data packets are, the less the available buffer is. This is because the SeNB needs to first transmit out the already buffered data packets. The more data packets buffered, the less data packets the SeNB expect to receive.

The SeNB may also decide the size of the available buffer for a UE based on the quality of a radio interface between the UE and the SeNB. In an example, the SeNB may receive a quality report of the radio interface from the UE. If the radio interface is of poor quality, the SeNB may expect to receive not many data packets even if the available buffer is large. Due to reasons of quality control, the data packets cannot reach the UE within a short time.

The SeNB may decide the size of available buffer for an E-RAB according to the number of packets buffered in the reserved buffer (i.e., the number of data packets currently in the buffer reserved for the E-RAB), or according to the quality of a radio interface between the UE and the SeNB.

At operation 402, the MeNB adjusts the amount of data assigned to the SeNB.

The MeNB may use the information of the available buffer transmitted by the SeNB together with other information. For example, the SeNB may also report information of PDCP data packets that have been transmitted to the UE successfully, and the MeNB may delete the data packets from the buffer in the MeNB. The MeNB may decide the amount of data assigned to the SeNB according to the size of the buffer for the user in the SeNB and the amount of data stored in the MeNB. In an example, if the available buffer is relatively small, the MeNB may reduce the amount of data assigned to the SeNB; and if the available buffer is relatively large, the MeNB may increase the amount of data assigned to the SeNB.

If the available buffer is for a UE and plural bearers have been established on the SeNB, the MeNB may decide the bearer on which the amount of data is to be adjusted, i.e., the bearer whose split ratio is to be adjusted, according to the quality of service (QoS) and the priority level of the E-RAB.

Example 2

Example 1 describes transmitting buffer information to an MeNB via a user data bearer on an X2 interface. Example 2 describes a mechanism in which an MeNB does not know the implementation method of an SeNB, and a user plane is established for an X2 interface when a split bearer is established. The user plane is for transmitting buffer information for a UE, and is not associated with any E-RAB. If the SeNB allocates buffer according to UEs, information of the size of available buffer is transmitted via the user plane. If the SeNB allocates buffer according to bearers, the information of the size of available buffer is transmitted via a user data plane corresponding to an E-RAB on the X2 interface.

Figure 6:
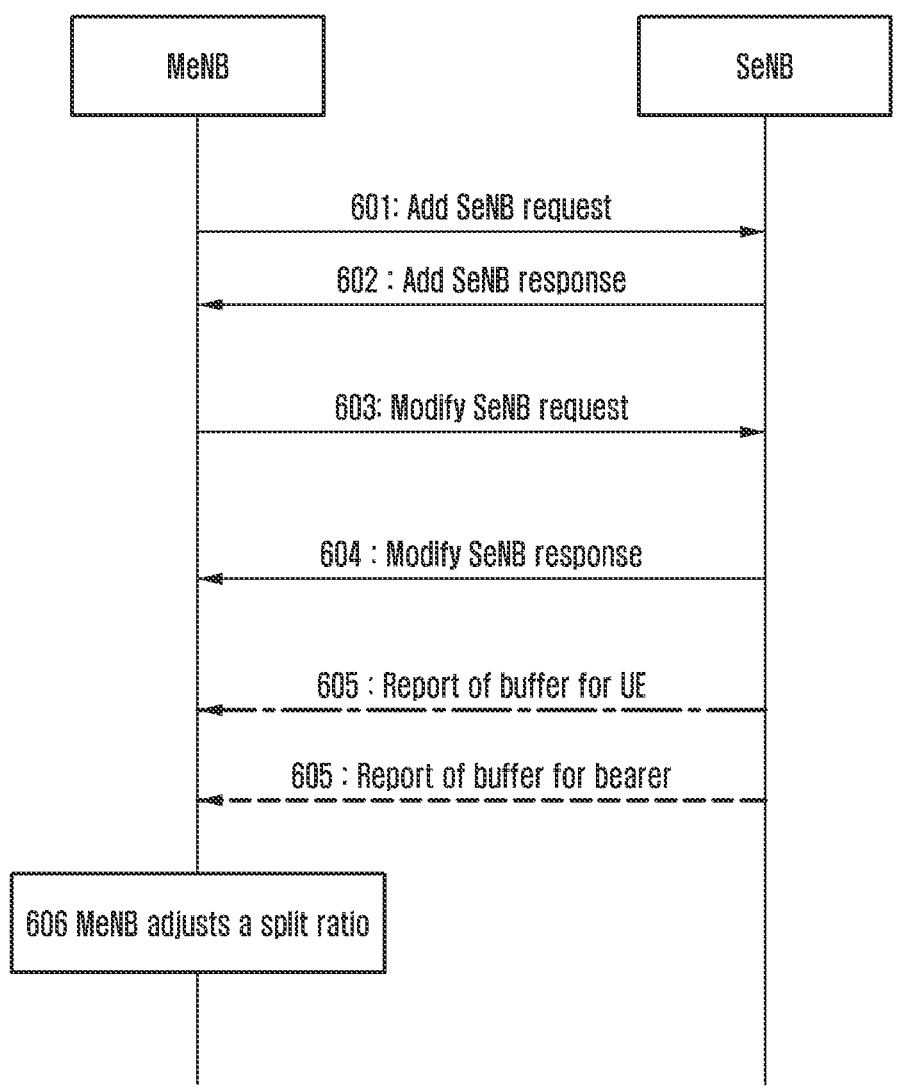
FIG. 6 is a flowchart illustrating a method of adjusting assigned data according to an embodiment of the present disclosure.

FIG. 6 is a flowchart illustrating a method of adjusting assigned data according to an embodiment of the present disclosure.

Referring to FIG. 6, the process may include the following operations.

At operation 601, an MeNB transmits an add SeNB request to an SeNB.

The MeNB decides to request the SeNB to establish radio resources for an E-RAB of a UE. The message also results in generation of UE context in the SeNB. The message may include information, such as information of the E-RAB, e.g., an identifier of the E-RAB, an identifier of the radio resources, quality information, information of an uplink data tunnel including an IP address and a tunnel ID on the user plane, information of capabilities of the UE, resource configuration information in the MeNB, and the like. The message may also include information of a UE uplink tunnel. The UE uplink tunnel is not associated with the E-RAB, may include an IP address and a tunnel ID, or only include the tunnel ID. The UE uplink tunnel is used for receiving the information of the size of available buffer allocated by the SeNB for the UE.

At operation 602, the SeNB transmits an add SeNB response to the MeNB.

The response transmitted by the SeNB to the MeNB may include configuration information and a radio resource control (RRC) container of a radio bearer that has been successfully established, and an IP address and a tunnel ID for downlink data reception of the bearer.

At operation 603, the MeNB transmits a modify SeNB request to the SeNB.

The MeNB decides to request the SeNB to establish radio resources for a second E-RAB of the UE. The request may include information of the second E-RAB, e.g., an identifier of the E-RAB, an identity of the radio resources, quality information. The request may also include an IP address and a tunnel ID for uplink data reception, information of capabilities of the UE, resource configuration information in the MeNB, and the like.

At operation 604, the SeNB transmits a modified SeNB response to the MeNB.

The response transmitted by the SeNB to the MeNB may include configuration information and an RRC container of a radio bearer that has been successfully established, and an IP address and a tunnel ID for downlink data reception of the bearer.

At operation 605, the SeNB transmits buffer information to the MeNB.

If the buffer of the SeNB is allocated for an E-RAB, the information of the available buffer is transmitted through an uplink data tunnel in a user data bearer corresponding to the E-RAB. The information may be transmitted alone or together with a data packet. The uplink data tunnel is established during an add/modify SeNB process. The information of the available buffer of the SeNB is transmitted to the MeNB via the established uplink data tunnel.

If the buffer is allocated by the SeNB for the UE, the information of the available buffer is transmitted through a UE uplink tunnel. The UE uplink tunnel is established during the process of establishing the SeNB.

The information of the available buffer may be transmitted in the header or the data packet field of a GTP-U packet through the uplink tunnel. The uplink tunnel may be the UE uplink tunnel or the uplink data tunnel in the user data bearer.

The SeNB may adopt the same manner as in Example 1 for deciding the size of the available buffer.

In an example, the size of the available buffer for a UE may be determined based on the number of packets buffered in the buffer reserved for the UE (i.e., the number of packets currently in the buffer reserved for the UE). The more the data packets are, the less the available buffer is. This is because the SeNB needs to first transmit out the already buffered data packets. The more data packets buffered, the less data packets the SeNB expect to receive.

The SeNB may also decide the size of the available buffer for a UE based on the quality of a radio interface between the UE and the SeNB. In an example, the SeNB may receive a quality report of the radio interface from the UE. If the radio interface is of poor quality, the SeNB may expect to receive not many data packets even if the available buffer is large. Due to reasons of quality control, the data packets cannot reach the UE in a short time.

The SeNB may decide the size of available buffer for an E-RAB according to the number of packets buffered in the reserved buffer (i.e., the number of data packets currently in the buffer reserved for the E-RAB), or according to the quality of a radio interface between the UE and the SeNB.

At operation 606, the MeNB adjusts the amount of data assigned to the SeNB.

The MeNB may use the information of the available buffer transmitted by the SeNB together with other information. For example, the SeNB may also report information of PDCP data packets that have been transmitted to the UE successfully, and the MeNB may delete the data packets from the buffer in the MeNB. The MeNB may decide the amount of data assigned to the SeNB according to the size of the buffer for the user in the SeNB and the amount of data stored in the MeNB. In an example, if the available buffer is relatively small, the MeNB may reduce the amount of data assigned to the SeNB; and if the available buffer is relatively large, the MeNB may increase the amount of data assigned to the SeNB.

If the available buffer is for a UE and plural bearers have been established on the SeNB, the MeNB decides a bearer for which the amount of data is to be adjusted, i.e., the bearer whose split ratio is to be adjusted, according to the QoS and the priority level of the E-RAB.

Hence, the process of the example is completed. In this example, a UE uplink tunnel is established on the X2 interface for transmitting information of available buffer for the UE. The UE uplink tunnel is established during the process of establishing the SeNB. In other examples, the UE uplink tunnel may be established in other processes, or established in an individual process.

Example 3

According to Example 3, an SeNB informs an MeNB of whether the available buffer in the SeNB is for an UE or for an E-RAB. Thus, the MeNB knows the implementation method of the SeNB before receiving the information of available buffer. Information of the size of available buffer in the SeNB is transmitted through a data plane corresponding to the E-RAB on an X2 interface. Since the MeNB knows the method adopted by the SeNB, the MeNB knows the buffer information is for the UE or for the bearer.

Figure 7:
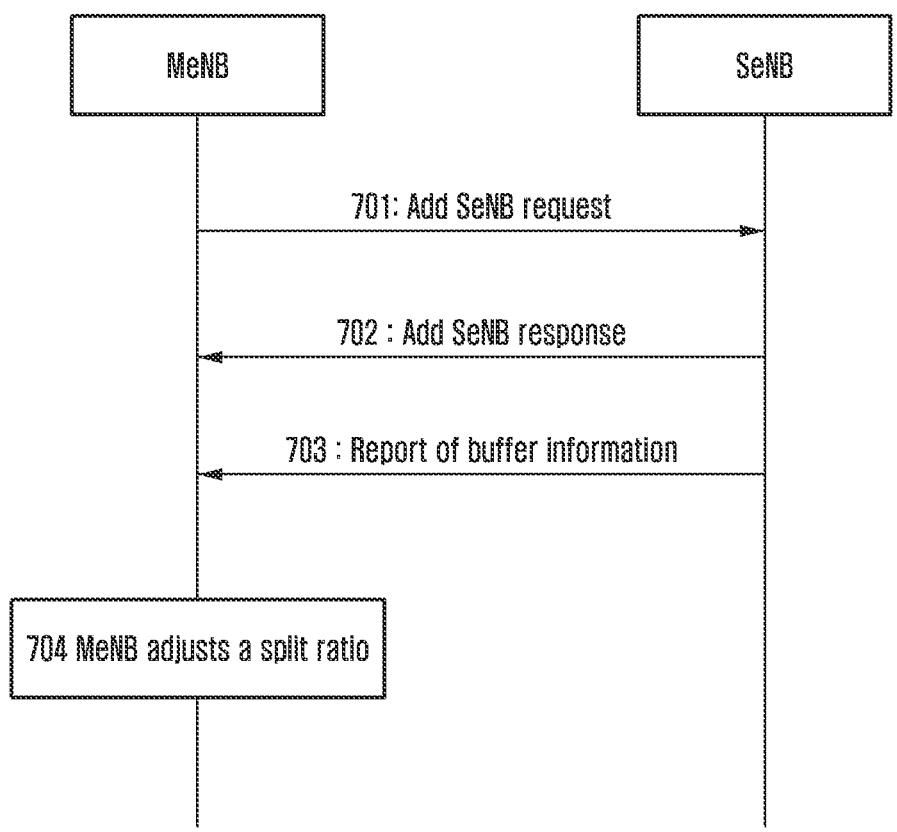
FIG. 7 is a flowchart illustrating a method of adjusting assigned data according to an embodiment of the present disclosure.

FIG. 7 is a flowchart illustrating a method of adjusting assigned data according to an embodiment of the present disclosure.

Referring to FIG. 7, the process may include the following operations.

At operation 701, an MeNB transmits an add SeNB request to an SeNB.

The MeNB decides to request the SeNB to establish radio resources for an E-RAB of a UE. The message also results in generation of UE context in the SeNB. The message may include information, such as information of the E-RAB, e.g., an identifier of the E-RAB, an identifier of the radio resources, quality information, information of an uplink data tunnel, an IP address and a tunnel ID on the user plane, information of capabilities of the UE, resource configuration information in the MeNB, and the like.

At operation 702, the SeNB transmits an add SeNB response to the MeNB.

The response transmitted by the SeNB to the MeNB may include configuration information and an RRC container of a radio bearer that has been successfully established, and an IP address and a tunnel ID for downlink data reception of the bearer. The response may also include information of capabilities of the SeNB which specifies whether the information of available buffer is for the UE or for an E-RAB.

The information may also be transmitted during the establishment of the X2 interface between the MeNB and the SeNB. The MeNB transmits an X2 setup request, and the SeNB transmits an X2 setup response to the MeNB. The X2 setup response may include the information of capabilities of the SeNB which indicates whether reports of buffer information are for the UE or for an E-RAB. Alternatively, the SeNB may transmit an X2 setup request to the MeNB, and the X2 setup response may include the information of capabilities of the SeNB which indicates whether reports of buffer information are for the UE or for an E-RAB.

In another example, the capability information may be configured in the MeNB in advance. The MeNB may get information on whether reports from the SeNB regarding available buffer are for the UE or for an E-RAB from OAM configuration information received in advance.

At operation 703, the SeNB transmits buffer information to the MeNB.

The buffer information is transmitted via an uplink data tunnel. The buffer information may be transmitted together with a data packet or transmitted individually. The uplink data tunnel is established during an add/modify SeNB process. The buffer information of the SeNB is transmitted to the MeNB via the established uplink data tunnel.

The information of available buffer may be transmitted in the header or the data packet field of a GTP-U packet through the uplink data tunnel.

The SeNB may adopt the same manner as in Example 1 for deciding the size of the available buffer.

The size of the available buffer for a UE may be determined based on the number of packets buffered in the buffer reserved for the UE (i.e., the number of packets currently in the buffer reserved for the UE). The more the data packets are, the less the available buffer is. This is because the SeNB needs to first transmit out the already buffered data packets. The more data packets already buffered, the less data packets the SeNB expects to receive.

The SeNB may also decide the size of the available buffer for a UE based on the quality of a radio interface between the UE and the SeNB. In an example, the SeNB may receive a quality report of the radio interface from the UE. If the radio interface is of poor quality, the SeNB may expect to receive not many data packets even if the available buffer is large. Due to reasons of quality control, the data packets cannot reach the UE in a short time.

The SeNB may decide the size of available buffer for an E-RAB according to the number of packets buffered in the reserved buffer (i.e., the number of data packets currently in the buffer reserved for the E-RAB), or according to the quality of a radio interface between the UE and the SeNB.

At operation 704, the MeNB adjusts the amount of data assigned to the SeNB.

The MeNB may use the information of the available buffer transmitted by the SeNB together with other information. For example, the SeNB may also report information of PDCP data packets that have been transmitted to the UE successfully, and the MeNB may delete the data packets from the buffer in the MeNB. The MeNB may decide the amount of data assigned to the SeNB according to the size of the buffer for the user in the SeNB and the amount of data stored in the MeNB. In an example, if the available buffer is relatively small, the MeNB may reduce the amount of data assigned to the SeNB; and if the available buffer is relatively large, the MeNB may increase the amount of data assigned to the SeNB.

If the available buffer is for a UE and plural bearers have been established on the SeNB, the MeNB decides the bearer on which the amount of data is to be adjusted, i.e., the bearer whose split ratio is to be adjusted, according to the QoS and the priority level of the E-RAB.

Hence, the process of the example is completed.

Example 4

In Example 4, an SeNB may also report information of lost packets transmitted via the X2 interface and the largest PDCP serial number of sequentially transmitted PDCP packets when reporting the buffer information. The report is referred to as downlink data transmission state report.

FIG. 9 is a schematic diagram illustrating a report of data transmission status according to an embodiment of the present disclosure.

Referring to FIG. 9, the downlink data transmission state reported by the SeNB may include the information of lost packets transmitted via the X2 interface and the largest PDCP serial number of sequentially transmitted PDCP packets. The MeNB transmits PDCP packets to the SeNB via the X2 interface. A serial number of the X2 interface, referred to as X2 SN, is added to each of the PDCP packets by the MeNB. The X2 SN is sequentially numbered. Each PDCP packet has a PDCP serial number (PDCP SN). PDCP packets transmitted by the MeNB to the SeNB may have sequential or non-sequential serial numbers.

FIG. 10 is a schematic diagram illustrating serial numbers of X2 transmissions and PDCP packets according to an embodiment of the present disclosure.

Referring to FIG. 10, PDCP SN corresponding to X2 SN={7, 8, 9, 10, 11, 12} is {1007, 1008, 1009, 1010, 1011, 1012}. According to mechanisms of the related art, supposing an SeNB received packets whose X2 SN=7, 11, 12, the SeNB may determine that packets whose X2 SN={8, 9, 10} are lost in X2 transmission. The SeNB may report the packet loss to the MeNB. The MeNB may adopt corresponding measures, e.g., the MeNB may transmit the PDCP packets whose X2 SN={8, 9, 10} to the UE.

According to the mechanisms of the related art, suppose packets whose X2 SN={7, 8, 9, 10, 11, 12} were received by the SeNB, and the SeNB had started to transmit the packets to the UE. PDCP packets whose X2 SN={7, 8, 12} had been transmitted successfully to the UE, and PDCP packets whose X2 SN={9, 10, 11} had been transmitted to the UE but were not successfully received by the UE thus the SeNB was re-transmitting the PDCP packets. At that moment, the MeNB initiated a bearer release process to delete the bearer from the SeNB. The SeNB needed to report the last data transmission state to the MeNB. Since no packet was lost on the X2 interface, in the report transmitted by the SeNB for the example as shown in FIG. 10 according to mechanisms of the related art, the largest PDCP serial number of sequentially transmitted PDCP packets is 1008, and the report does not include information of lost packets transmitted via the X2 interface. The MeNB received the report, determined that transmission of PDCP packets whose PDCP SN={9, 10, 11, 12} has failed, and would re-transmit PDCP packets whose PDCP SN={9, 10, 11, 12} to the UE. But in fact, the PDCP packet whose PDCP SN={12} had been transmitted successfully. The re-transmission is unnecessary.

In order to address the issue, when the SeNB reports the last data transmission state to the MeNB, the largest PDCP serial number of PDCP packets sequentially transmitted is set to be the PDCP serial number of the last PDCP packet successfully transmitted to the UE instead of the PDCP serial number of sequentially transmitted PDCP packets, the information of lost packets transmitted over the X2 interface is set to include information of lost packets on the X2 interface and information of packets being re-transmitted by the SeNB. According to the example as shown in FIG. 10, the largest PDCP serial number of packets successfully transmitted to the UE by the SeNB is 1012. The SeNB reports information of PDCP packets that have not been successfully transmitted to the UE at that moment, including X2 SN of packets lost on the X2 interface and X2 SN of packets being re-transmitted (i.e., packets that have been successfully received by the SeNB via X2 and have been transmitted to the UE but the UE has not received thus are being re-transmitted), to the MeNB as information of lost packets in the X2 interface.

For example, information of lost packet on the X2 interface in the last data transmission state report includes information of packets that are being re-transmitted.

If the SeNB has both to-be-retransmitted packets and packets lost over the X2 interface when the bearer is to be released, information of the packets is reported to the MeNB via information of lost packets transmitted over the X2 interface in the data transmission state report.

The information of packets lost on the X2 interface are reported using a range between serial numbers, i.e., using the serial number of the first lost packet and the serial number of the last lost packet. In the example as shown in FIG. 10, if the serial numbers of packets lost over the X2 interface are X2 SN={9, 10, 11}, the information of lost packets on the X2 interface is {8, 12}. The last data transmission state is reported using the same manner. In the example as shown in FIG. 10, if serial numbers of packets that are being re-transmitted are X2 SN={9, 10, 11}, the information of packets lost on the X2 interface in the last data transmission state is {8, 12}.

The above are several examples of the data assigning method of the present disclosure. Various examples also provide an apparatus for assigning data to split bearers in dual connectivity which can implement the method of various example.

Figure 8:
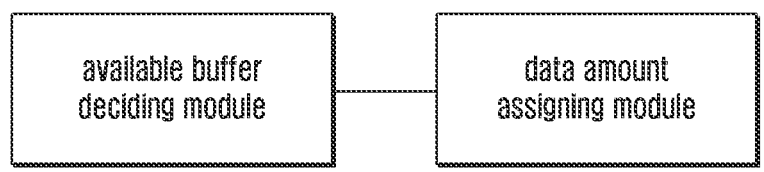
FIG. 8 is a schematic diagram illustrating modules of an apparatus for assigning data according to an embodiment of the present disclosure.

FIG. 8 is a schematic diagram illustrating modules of an apparatus for assigning data according to an embodiment of the present disclosure.

Referring to FIG. 8, the apparatus may include an available buffer deciding module and a data amount assigning module.

The available buffer deciding module is configured for receiving information of available buffer decided and transmitted by an SeNB via an X2 interface, and deciding whether the information is about available buffer for a UE or for an E-RAB established on the SeNB according to an indicator in the information of the available buffer or according to a bearer that transported the information of the available buffer. The data assigning module is configured for adjusting the amount of data assigned to the SeNB according to the received information of the available buffer.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a second base station, the method comprising:
    generating information on a first buffer for an evolved universal terrestrial radio access network (E-UTRAN) radio access bearer (E-RAB) and information on a second buffer for a terminal which is associated with a first base station and a second base station; and
    transmitting the information on the first buffer, the information on the second buffer, and an uplink data packet to the first base station via an X2 interface between the first base station and the second base station.

2. The method of claim 1, wherein the information on the first buffer for the E-RAB precedes the information on the second buffer for the terminal.

3. The method of claim 1, wherein information on packet data convergence protocol (PDCP) data packets successfully delivered to the terminal by the second base station is transmitted from the second base station to the first base station with the information on the first buffer and the information on the second buffer.

4. The method of claim 1, further comprising:
    receiving, from the first base station, PDCP data packets to be transmitted to the terminal by the second base station.

5. A second base station in a wireless communication system, the second base station comprising:
    a transceiver configured to transmit and receive signals to and from a first base station and a terminal which is associated with the first base station and the second base station; and
    a controller configured to:
        control to generate information on a first buffer for an evolved universal terrestrial radio access network (E-UTRAN) radio access bearer (E-RAB) and information on a second buffer for the terminal, and
        control the transceiver to transmit the information on the first buffer, the information on the second buffer, and an uplink data packet to the first base station via an X2 interface between the first base station and the second base station.

6. The second base station of claim 5, wherein the information on the first buffer for the E-RAB precedes the information on the second buffer for the terminal.

7. The second base station of claim 5, wherein information on packet data convergence protocol (PDCP) data packets successfully delivered to the terminal by the second base station is transmitted from the second base station to the first base station with the information on the first buffer and the information on the second buffer.

8. The second base station of claim 5, wherein the controller is further configured to control the transceiver to receive PDCP data packets to be transmitted to the terminal by the second base station from the first base station.

* * * * *